United States Patent
Paterour (10) Patent No.: US 11,121,866 B2
(45) Date of Patent: Sep. 14, 2021

(54) METHOD FOR CONFIGURING ACCESS TO FALLBACK COMMUNICATION SERVICES AND ASSOCIATED SYSTEM

(71) Applicant: AIRBUS DS SLC, Elancourt (FR)

(72) Inventor: Olivier Paterour, Guyancourt (FR)

(73) Assignee: AIRBUS DS SLC, Elancourt (FR)

(*) Notice: Subject to any disclaimer, the term of this patent is extended or adjusted under 35 U.S.C. 154(b) by 293 days.

(21) Appl. No.: 16/395,719

(22) Filed: Apr. 26, 2019

(65) Prior Publication Data
US 2019/0334709 A1    Oct. 31, 2019

(30) Foreign Application Priority Data
Apr. 27, 2018 (FR) ...................................... 1853739

(51) Int. Cl.
*H04L 29/06* (2006.01)
*H04L 9/08* (2006.01)
(Continued)

(52) U.S. Cl.
CPC .............. *H04L 9/0833* (2013.01); *H04L 9/14* (2013.01); *H04L 9/321* (2013.01)

(58) Field of Classification Search
CPC ......... H04L 9/0833; H04L 9/14; H04L 9/321; H04W 24/04; H04W 12/06; H04W 4/10; H04W 4/00
See application file for complete search history.

(56) References Cited

U.S. PATENT DOCUMENTS 8,391,136 B1 * 3/2013 Eidelson ................. H04L 51/32
  370/228
8,780,703 B1 * 7/2014 Eidelson ............. H04L 41/0668
  370/228
(Continued)

FOREIGN PATENT DOCUMENTS

KR   20110126160 A  * 11/2011  ......... H04L 41/0869
WO   WO 2016/122224 A1   8/2016
WO   WO-2016160256 A1 * 10/2016  ........ H04W 12/0433

OTHER PUBLICATIONS

"Vargas Bautista et al., "Performance of CS Fallback from LTE to UMTS", Sep. 2013, IEEE Communications Magazine, pp. 136-143" (Year: 2013).*

(Continued)

*Primary Examiner* — John B King
(74) *Attorney, Agent, or Firm* — Pillsbury Winthrop Shaw Pittman LLP (57) ABSTRACT

A method for configuring access by a user to fallback communication services, includes sending by an application client an authentication request to an identity management server; and in the event of rejection: the identity management server allocates a fallback identifier and sends the fallback identifier to the application client; the application client sends a request for fallback user profile to a configuration management server; the application client sends a request for fallback multimedia group profiles to a multimedia group management server; the application client sends a request for fallback multimedia group encryption keys and private communications encryption keys to an encryption keys management server; once the application client has received the fallback user profile, the fallback multimedia group profile(s), the fallback multimedia group encryption key(s) and the private communications encryp- (Continued)

tion key(s), the user can access the fallback communication services.

12 Claims, 3 Drawing Sheets

(51) Int. Cl.
*H04L 9/14* (2006.01)
*H04L 9/32* (2006.01)

(56) References Cited

U.S. PATENT DOCUMENTS

| | | | | |
|---|---|---|---|---|
| 10,117,098 | B1* | 10/2018 | Naguthanawala | H04L 63/18 |
| 10,972,913 | B2* | 4/2021 | Kim | H04W 8/08 |
| 2005/0064821 | A1* | 3/2005 | Hedberg | H04W 48/18 455/67.11 |
| 2009/0116703 | A1* | 5/2009 | Schultz | G06F 21/32 382/118 |
| 2011/0070900 | A1* | 3/2011 | Shi | H04W 68/00 455/458 |
| 2013/0055368 | A1* | 2/2013 | Bauckman | H04L 51/12 726/7 |
| 2013/0227030 | A1* | 8/2013 | Eidelson | H04L 51/066 709/206 |
| 2014/0273963 | A1* | 9/2014 | Su | G06F 21/32 455/411 |
| 2014/0321444 | A1* | 10/2014 | Klein | H04W 76/14 370/338 |
| 2015/0319242 | A1* | 11/2015 | Olster | G06F 11/2094 707/634 |
| 2019/0116483 | A1* | 4/2019 | Ryu | H04W 76/32 |
| 2019/0158240 | A1* | 5/2019 | Li | H04L 1/1861 |
| 2020/0214070 | A1* | 7/2020 | Ingale | H04W 74/0833 |

OTHER PUBLICATIONS

"Tanaka et al., "CS Fallback Function for Combined LTE and 3G Circuit Switched Services", 2009, NTT DOCOMO Technical Journal vol. 11 No. 3, pp. 13-19" (Year: 2009).*

Search Report as issued in French Patent Application No. 1853739, dated Feb. 14, 2019.

"3$^{rd}$ Generation Partnership Project; Technical Specification Group Services and System Aspects; Study on application architecture to support Mission Critical Push to Talk over LTE (MCPTT) services (Release13)," 3GPP Standard; Technical Report, vol. SA WG6, No. V13.0.0, Sep. 2015, pp. 1-251, XP051294333.

Pope, M., et al., Secretary TSA SA, "Draft Report of TSG SA meeting #74," 3GPP Draft, vol. TSG SA, Mar. 2017, Retrieved on the Internet: URL:http://www.3gpp.org/ftp/Meetings_3GPP_SYNC/SA/Docs; [retrieved on Mar. 4, 2017], 131 pages.

* cited by examiner

METHOD FOR CONFIGURING ACCESS TO FALLBACK COMMUNICATION SERVICES AND ASSOCIATED SYSTEM

CROSS REFERENCE TO RELATED APPLICATIONS

This application claims priority to French Patent Application No. 1853739, filed Apr. 27, 2018, the entire content of which is incorporated herein by reference in its entirety.

FIELD

The technical field of the invention is that of fallback procedures to enable access to communication services and more specifically that of fallback procedures to enable access to communication services relying on a transport network, the access to the communication services requiring an authentication. The present invention relates to a method for configuring access to fallback communication services and in particular a method for configuring access to fallback communication services accessible via a transport network, the access to the communication services requiring an authentication. The present invention also relates to a system enabling the implementation of such a method.

BACKGROUND

On private networks such as Tetra, TetraPol and P25 networks dedicated to public safety, fallback procedures exist making it possible to offer a minimum communication service to a user being close to a relay having lost its connection with a central communications network. Indeed, the relay can either maintain the communications underway on the relay, or use a default configuration, which enables communication between all the users being close to the relay. A user in distress can thus request assistance, the communication services being maintained locally.

The 3GPP standard governing mobile networks of "Global System for Mobile Communications" or GSM type itself also sets out a fallback procedure known as "Isolated E-UTRAN Operation for Public Safety" or IOPS enabling an "evolved Node B" or eNB type network node to establish communication with a local network when communication with the central network is lost. Yet, in certain transport networks such as for example mobile GSM networks, a user has to be authenticated with an authentication server managing the accesses to the communication services proposed by the network, that is to say that the authentication information of the user must be found in a database of users to which the authentication server has access.

Following the IOPS fallback procedure, the authentication server only has access to a local database of users which generally only contains information relative to a very limited number of users. Thus, in a routine manner, the authentication of the user fails and said user cannot have access to the communication services. The failure or the success of the authentication is thus conditioned by the location of the user, which is not satisfactory.

There thus exists a need for a user to be able to access, whatever his position, communication services proposed via a transport network no longer having a connection with the corresponding central network, the access to the communication services requiring an authentication.

SUMMARY

An aspect of the invention offers a solution to the aforementioned problems, by enabling a user connected to a transport network to be able to access fallback communication services proposed via the transport network, requiring an authentication, whatever the location of this user.

A first aspect of the invention relates to a method for configuring access by a user to fallback communication services accessible via a transport network, the access to the fallback communication services requiring an authentication, the method comprising the following steps:

an application client hosted on a user equipment sends an authentication request to an identity management server;

in the event of rejection of the authentication request by the identity management server:

- the identity management server allocates a unique fallback identifier to the user and sends the fallback identifier to the application client;
- the application client sends a request for fallback user profile comprising the fallback identifier to a configuration management server and receives a corresponding fallback user profile sent by the configuration management server, the user is then authenticated in "fallback mode";
- the application client sends a request for fallback multimedia group profiles comprising the fallback identifier to a multimedia group management server and receives at least one corresponding fallback multimedia group profile sent by the multimedia group management server;
- the application client sends a request for fallback multimedia group encryption keys and private communications encryption keys comprising the fallback identifier to an encryption keys management server and receives at least one fallback multimedia group encryption key and at least one corresponding private communications encryption key sent by the encryption keys management server;
- once the application client has received the fallback user profile, the fallback multimedia group profile(s), the fallback multimedia group encryption key(s) and the private communications encryption key(s), the user can access the fallback communication services.

Thanks to the invention, the user of which the authentication has failed within the framework of a fallback procedure can nevertheless access communication services using a fallback identifier enabling him to obtain a fallback user profile, at least one fallback multimedia group profile, at least one fallback multimedia group encryption key and one private communications encryption key, the configuration elements required to obtain access to fallback multimedia groups proposing fallback group communication services and to establish private communications.

Apart from the characteristics that have been mentioned in the preceding paragraph, the method according to a first aspect of the invention may have one or more additional characteristics among the following, considered individually or according to all technically possible combinations thereof.

According to an embodiment, the fallback identifier is allocated dynamically. Thus, the fallback identifiers are not provided in advance in the identity management server which makes it possible for example to avoid a shortage of fallback identifiers to allocate.

According to an embodiment which can be combined with the preceding embodiment, once the identity management server has received the authentication request sent by the application client, the identity management server carries out a step of processing the authentication request comprising the following sub-steps:

the identity management server requests at least one authentication information from the user;

the user supplies the authentication information requested via the user equipment;

the application client sends the authentication information supplied by the user to the identity management server and the identity management server receives the authentication information;

the identity management server browses a database of users:

if the identity management server does not find the authentication information in the database of users, the authentication request is rejected;

if the identity management server finds the authentication information in the database of users, the authentication request is accepted.

Thus, the management server applies a standard authentication protocol.

According to an example of this embodiment, the fallback identifier is associated with the authentication information supplied by the user. Thus, the fallback identifier is specific to the user which signifies that in the event of disconnection and reconnection, the same fallback identifier is allocated to this same user.

According to an embodiment which can be combined with the preceding embodiments, in the event of acceptance of the authentication request by the identity management server, the user is authenticated in "nominal mode" in which he has access to a nominal user profile and to nominal multimedia groups that the user has defined himself during preceding connections or that an administrator has defined for him. Thus, if the authentication is successful, the user has access to the user profile and to the multimedia groups that he has chosen himself or that an administrator has defined for him within the framework of a mission.

According to an embodiment which can be combined with the preceding embodiments, each user of a fallback multimedia group communicates with the other users of the fallback multimedia group. Thus, a user authenticated in fallback mode can communicate with other users and thus has access to communication services within each fallback multimedia group.

According to an example of this embodiment, during a communication between several users, each user is identified by his fallback identifier which is transmitted and displayed on a screen of the user equipment of each other user. Thus, during a private or group conversation, a user can, for example, easily identify the person that is speaking and the number of persons participating in the conversation.

According to an example of this embodiment and the preceding embodiment being able to be combined with the preceding example, users authenticated in "nominal mode" and users authenticated in "fallback mode" cannot communicate with each other. Thus, since users authenticated in fallback mode have not been authenticated nominally, the security of data exchanged by users authenticated in nominal mode is not placed in danger.

According to an embodiment which can be combined with the preceding embodiments, the fallback user profile comprises a list of fallback multimedia group identifiers. Thus, the fallback user profile is linked to a list of fallback multimedia groups to which the user may have access.

According to an example of this embodiment, the multimedia group management server sends to the application client the fallback multimedia group profile of each fallback multimedia group of which the fallback multimedia group identifier is included in the list of fallback multimedia group identifiers. Thus, the user has access to the fallback multimedia groups to which his fallback user profile gives him access.

According to an embodiment which can be combined with the preceding embodiments, the user is informed that he is in "fallback mode" by display of the fallback identifier on a screen of the user equipment. Thus, the user is informed that he is authenticated but that he will not have access to his nominal user profile.

A second aspect of the invention relates to a system for the implementation of the method according to a first aspect of the invention characterised in that it comprises:

at least one user equipment used by a user, the user equipment hosting an application client configured to send requests to servers and to obtain information coming from the servers;

at least one database of users;

at least one identity management server configured to receive and to process an authentication request sent by an application client, to search for authentication information in a database of users and to allocate a unique fallback identifier to a user;

at least one configuration management server configured to receive a request for fallback user profile and to send a fallback user profile to an application client;

at least one multimedia group management server configured to receive a request for fallback group multimedia profiles and to send at least one fallback multimedia group profile to an application client;

at least one encryption keys management server configured to receive a request for fallback multimedia group encryption keys and private communications encryption keys and to send at least one fallback multimedia group encryption key and one private communications encryption key to an application client.

According to an embodiment, the system comprises an operational administrator configured to monitor, on the fallback multimedia groups, the activity of users authenticated in "fallback mode", to establish communication with users authenticated in "fallback mode" and to link up users authenticated in "fallback mode" with users authenticated in "nominal mode". Thus, the operational administrator may for example identify malevolent users authenticated in fallback mode or make it possible to link up a fallback user in distress with a nominal multimedia group able to provide him with assistance.

According to an embodiment which can be combined with the preceding embodiments, the system is compliant with the 3GPP MCS standard.

In an aspect of the invention, there is provided a non-transitory computer readable medium comprising program code instructions for performing the steps of the process according to the above method when the program is executed on a computer.

In an aspect of the invention, there is provided a user equipment comprising circuitry for implementing the method according to claim 1.

The invention and its different applications will be better understood on reading the description that follows and by examining the figures that accompany it.

BRIEF DESCRIPTION OF THE FIGURES

The figures are presented for indicative purposes and in no way limit the invention.

DETAILED DESCRIPTION

Unless specified otherwise, a same element appearing in the different figures has a single reference.

A first aspect of the invention relates to a method 100 for configuring access to fallback communication services accessible via a transport network, the access to the fallback communication services requiring an authentication.

"Fallback services" are taken to mean the services proposed by a fallback procedure.

In the present application, "fallback procedure" is taken to mean a back-up procedure implemented by a transport network at the local level when communication with a corresponding central network is lost, making it possible to offer a minimum communication service.

The method according to a first aspect of the invention is implemented at the application level in such a way that the communication services rely on means supplied by the transport network. Access to the communication services is then conditioned by an authentication at the application level. "Application level" or "application part" is taken to mean what is relative to the application layer according to the OSI or "Open Systems Interconnection" model which relates to the access point to the services proposed by a network.

In the present application, the application part is de-correlated from the transport network part. Such a transport network is, for example, a 5G network, a Wireless Local Area Network (WLAN), a Satellite Wide Area Network (SWAN) or a GSM type transport network, comprising among others networks of General Packet Radio Service (GPRS), Enhanced Data Rates for GSM Evolution (EDGE), Universal Mobile Telecommunications System (UMTS), Long Term Evolution (LTE) and LTE-Advanced type.

The transport network may be fixed, for example a transport network covering a company, or tactical, that is to say mobile, used, for example, in the case of a specialised forces mission. Thus, if a user having to participate in a mission has a deficient connection to the central network on account of bad weather, he may be authenticated in fallback mode on the local network.

"Access to communication services" is taken to mean access to services linked to the communication, for example access to audio, to video, to messaging with files to interact with one or more users or instead localisation services potentially enriched, in the case of a mission, with information, for example, on the positioning of users or points of interest. The communication services make it possible to establish private communications between two users or group communications between the members of a multimedia group.

"Multimedia group" is taken to mean a virtual group grouping together several users who can interact with each other once connected via a server (e.g. a physical server) enabling access to the multimedia group.

A second aspect of the invention relates to a system 200 enabling the implementation of the method 100 according to a first aspect of the invention.

Figure 2:
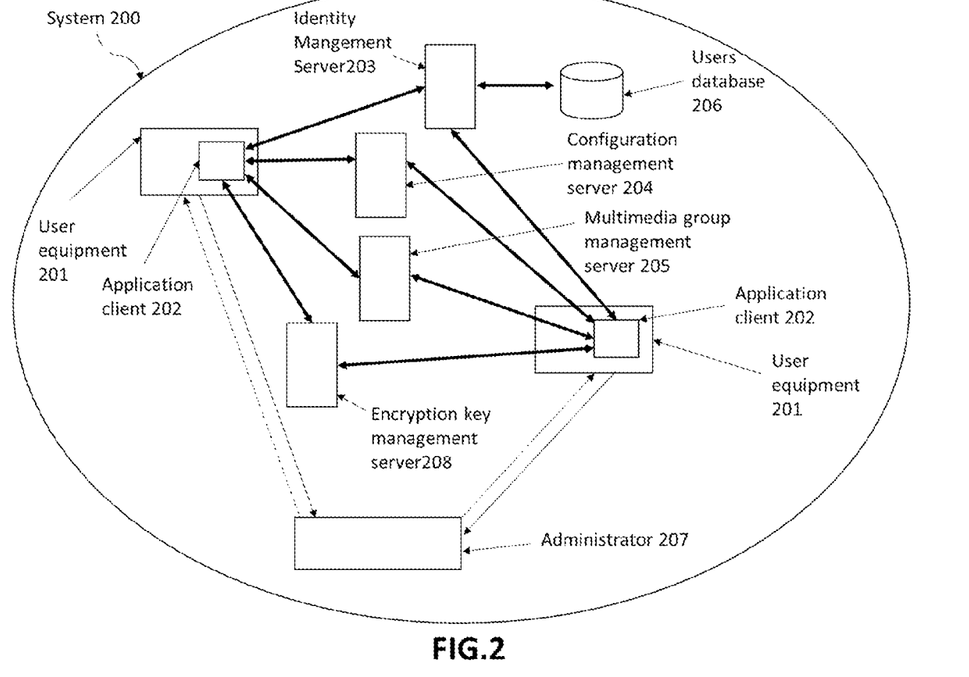
FIG. 2 shows a schematic representation of a system according to a second aspect of the invention implementing the method according to a first aspect of the invention.

The system 200, illustrated in FIG. 2, comprises two user equipments 201, each hosting an application client 202.

"Application client" is taken to mean a computer client, that is to say a software that sends demands or requests to one or more servers within a network.

"An application client is hosted on a user equipment" is taken to mean that the application client is implemented on the user equipment.

Each application client 202 is configured to send requests or demands to servers and to obtain information coming from the servers.

The system 200 also comprises four servers: an identity management server 203, a configuration management server 204, a multimedia group management server 205 and an encryption key management server 208.

The identity management server 203 is configured to receive and to process authentication requests sent by the application clients 202, to search for authentication information in a database of users 206 belonging to the system 200 and to allocate a unique fallback identifier to each user of which the authentication request is rejected.

The configuration management server 204 is configured to receive a request for fallback user profile and to send a fallback user profile to each application client 202 corresponding to a user of which the authentication request is rejected.

The multimedia group management server 205 is configured to receive a request for fallback multimedia group profiles and to send at least one fallback multimedia group profile to each application client 202 corresponding to a user of which the authentication request is rejected.

The encryption keys management server 208 is configured to receive a request for fallback multimedia group encryption keys and private communications encryption keys and to send at least one fallback multimedia group encryption key and one private communications encryption key to each application client 202 corresponding to a user of which the authentication request is rejected.

Figure 3:
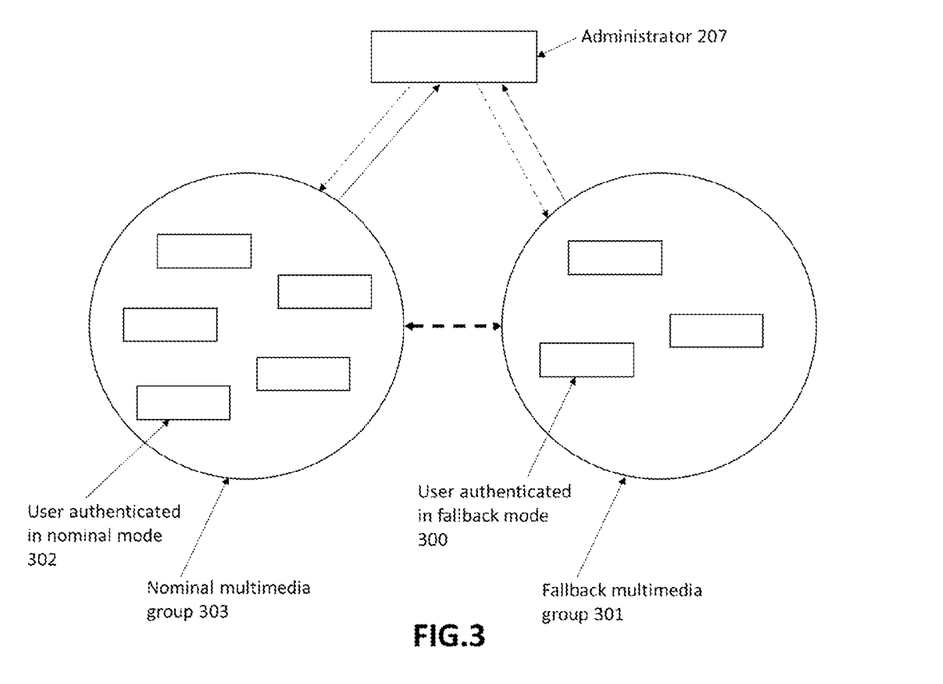
FIG. 3 illustrates the role of the operational administrator within the system according to a second aspect of the invention.

The system 200 also comprises an operational administrator 207 of which the role is illustrated in FIG. 3, configured, on the one hand, to monitor the activity of the members in each fallback multimedia group 301 and to establish communication with users authenticated in fallback mode if required and configured, on the other hand, to establish communication between the members of a fallback multimedia group 301 and the members of a nominal multimedia group 303 and to establish communication between a user authenticated in fallback mode and a user authenticated in nominal mode.

Indeed, the members of a fallback multimedia group 301 are all users 300 authenticated in fallback mode and the members of a nominal multimedia group 303 are all users 302 authenticated in nominal mode in such a way that the users 302 authenticated in nominal mode cannot communicate with the users 300 authenticated in fallback mode without intervention of the operational administrator 207.

Thus, in FIG. 3, the solid arrows between each multimedia group 301, 303 and the operational administrator 207 correspond to the surveillance of each multimedia group 301, 303 by the operational administrator 207 and the dotted arrows correspond to the potential establishment of a communication between each multimedia group 301, 303 and the operational administrator 207.

The dotted arrow between the nominal multimedia group 303 comprising five users 302 authenticated in nominal mode and the fallback multimedia group 301 comprising three users 300 authenticated in fallback mode corresponds to the potential establishment of communication between the fallback multimedia group 301 and the nominal multimedia group 303.

Figure 1:
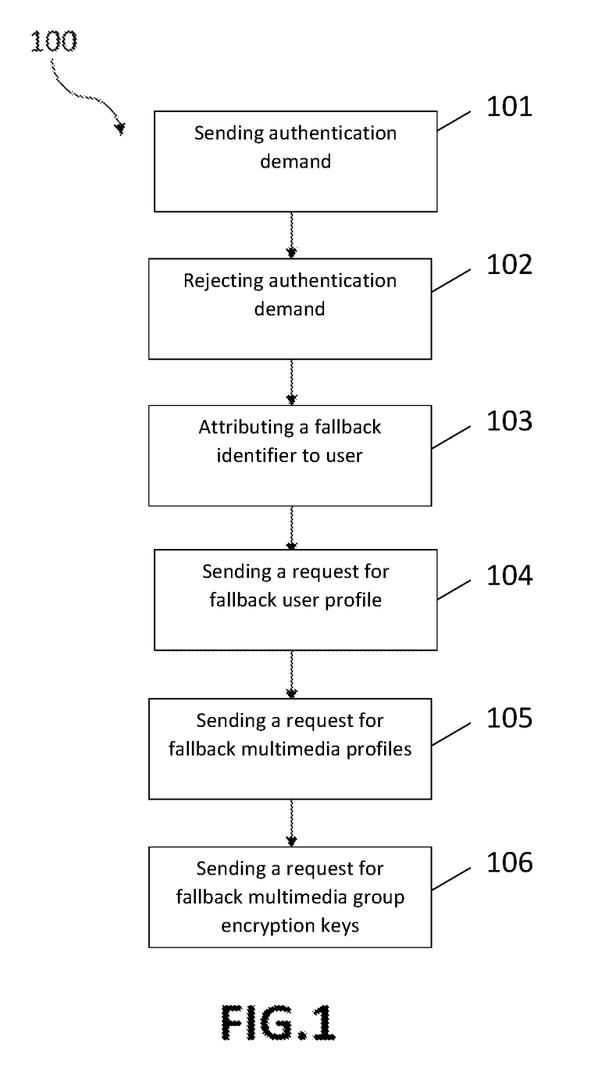
FIG. 1 is a synoptic diagram illustrating the main steps of a method for configuring access to fallback communication services according to a first aspect of the invention.

The method 100 according to a first aspect of the invention comprises several steps of which the sequencing is represented in FIG. 1.

During a first step 101 of the method 100, a user 300, 302 having a user equipment 201 hosting an application client 202 sends an authentication demand or request to an identity management server 203 through the application client 202.

The user equipment 201 is for example a smartphone, a tablet or a portable computer. Generally speaking, the user equipment 201 has a screen.

The authentication request sent by the application client 202 is then processed by the identity management server 203.

This processing step comprises for example several sub-steps:
- a first sub-step of reception of the authentication request sent by the application client 202 by the identity management server 203;
- a second sub-step of sending a request for at least one authentication information to the user 300, 302 by the identity management server 203 and of reception of the request by the user equipment 201;
- a third sub-step of supplying the requested authentication information, by the user 300, 302 using the user equipment 201;
- a fourth sub-step of sending the authentication information supplied by the user 300, 302 by the application client 202 to the identity management server 203 and of reception of the authentication information by the identity management server 203;
- a fifth sub-step of browsing a database of users 206 by the identity management server 203 to determine if the database of users 206 comprises or not the authentication information.

At the end of the fifth sub-step, if the identity management server 203 has not found the authentication information, the authentication request is rejected. Conversely, if the identity management server 203 has found the authentication information, the authentication request is accepted.

The identity management server 203 thus uses a standard authentication protocol, such as for example the OpenID-Connect protocol developed in the 3GPP standard for Mission Critical Services (MCS).

The authentication information is for example a password and/or a user name and/or a biometric datum.

The database of users 206 is for example a base of identifiers that links up the authentication information with a corresponding identifier.

In the case where the authentication request is accepted, the identifier corresponding to the authentication information of the user 302 is sent to the application client 202. Thanks to the identifier, the user 302 accesses his user profile, his group profiles and his group encryption keys, his private communications encryption keys, his multimedia groups and more generally all the information linked to the user 302. The user 302 can then connect in "nominal mode" that is to say that the user 302 can have access to all that has been defined during preceding connections by himself or by an administrator. The user 302 then has access to the nominal group communication services proposed by the nominal multimedia groups 303 to which he has access to communicate with the other members of each nominal multimedia group 303 and to private communication services to communicate with a single other user.

Connection in nominal mode is the most common case that arises, either when communication is maintained with the central network and when the user 302 does not supply erroneous authentication information, or when communication is lost with the central network and when the authentication information supplied by the user 302 is found in the local database of users 206 used in the fallback procedure. This latter situation is very rare since the local database of users 206 comprises little information and, in practice, when communication is lost with the central network, the majority of users cannot connect in nominal mode.

The second step 102 of the method 100 corresponds to the case where the authentication request is rejected. If the identity management server allows the fallback mode, a third step 103 of the method 100 is then carried out. Indeed, the identity management server may be capable of implementing the method 100 according to the invention and all the same not implement it if the identity management server does not allow the fallback mode.

During the third step 103 of the method 100, a fallback identifier is attributed to the user 300 by the identity management server 203 and sent to the corresponding application client 202. The attributed fallback identifier is unique, that is to say that the fallback identifier will not be allocated to any other user 300, 302.

The fallback identifier may be specific to the user. In this case, the fallback identifier is associated with the authentication information supplied by the user 300 during the step 102 of processing the authentication request. Thus, if a fallback identifier is attributed to a user 300 during a first connection in fallback mode and if the user 300 connects again later, the same fallback identifier is attributed to him.

The fallback identifier is allocated dynamically by the identity management server 203. The identity management server 203 thus allocates the fallback identifier during the method, that is to say that the fallback identifier is not provided in advance.

During a fourth step 104 of the method 100, the fallback identifier is used to obtain a fallback user profile. Indeed, the application client 202 sends a request for fallback user profile to a configuration management server 204, the request for fallback user profile comprising the fallback identifier. The application client 202 then receives in return the fallback user profile corresponding to the fallback identifier.

The user 300 is then authenticated in fallback mode. The user 300 can then be informed that he is in fallback mode, for example by a display of the fallback identifier on the screen of the user equipment 201.

The fallback user profile may comprise a list of fallback multimedia group identifiers corresponding to the fallback multimedia groups to which his fallback user profile gives him access.

During a fifth step 105 of the method 100, the application client 202 sends a request for fallback multimedia group profiles to a multimedia group management server 205, the request for fallback multimedia group profiles comprising the fallback identifier. The application client 202 then receives in return the fallback multimedia group profile associated with each fallback multimedia group identifier of the list of fallback multimedia group identifiers.

During a sixth step 106 of the method 100, the application client 202 sends a request for fallback multimedia group encryption keys and private communications encryption keys to an encryption keys management server 208, the request for fallback multimedia group encryption keys and private communications encryption keys comprising the fallback identifier. The application client 202 then receives in return the fallback multimedia group encryption key from each fallback multimedia group identifier of the list of fallback multimedia group identifiers and the private communications encryption key(s) associated with the fallback identifier.

The encryption keys are indispensable to the protection of the exchanged data, enabling end-to-end encryption, that is to say from user to user, of the exchanged data. Thus, a fallback multimedia group encryption key makes it possible to encrypt and decrypt the data exchanged within a fallback multimedia group so that only the members of the fallback multimedia group can access these data. A private communications encryption key makes it possible to encrypt and decrypt the data that a given user is going to exchange with another given user. Thus, if an external individual not having the encryption key recovers the data, the data will be encrypted and thus unintelligible.

Once the application client 202 has received the fallback user profile, the fallback multimedia group profile(s), the fallback multimedia group encryption keys(s) and the private communications encryption key(s), the application client 202 has all the configuration elements enabling it to access the fallback group communication services proposed by each fallback multimedia group for which it has obtained the profile and the fallback private communications services.

The fallback user profile is thus associated with a certain number of fallback multimedia groups 301 to which the user has access once the corresponding fallback multimedia group profiles and the encryption keys are obtained.

Each fallback multimedia group 301 proposes fallback group communication services, enabling the user 300 to communicate with the other members of the fallback multimedia group 301.

When the members of a fallback multimedia group 301 communicate with each other, as in the case of a group call by "Push-To-Talk" or PTT, each member is for example identified thanks to his fallback identifier which is transmitted and displayed on the screen of the user equipment 201 of each member of the fallback multimedia group 301. This may also be the case within the framework of a private communication between two users authenticated in fallback mode.

The fallback communication services are for example audio, video, messaging or localisation.

The choice of the fallback communication services and the fallback multimedia groups to which the user has access may be chosen by the operator of the communication network.

The members of a fallback multimedia group 301 are all users 300 authenticated in fallback mode. Similarly, the members of a nominal multimedia group 303 are all users 302 authenticated in nominal mode. Thus, users 302 authenticated in nominal mode cannot communicate with users 300 authenticated in fallback mode without the intervention of the operational administrator 207.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, solid state drives, USB drives, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, microcontroller, digital signal processor (DSP) a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user.

The invention claimed is:

1. A method for configuring access by a user to fallback communication services accessible via a transport network, the access to the fallback communication services requiring an authentication, the method comprising:
   sending, by an application client hosted on a user equipment, an authentication request to an identity management server;
   in the event of rejection of the authentication request by the identity management server:
      allocating, by the identity management server, a unique fallback identifier to the user and sending, by the identity management server, the unique fallback identifier to the application client;
      sending, by the application client, a request for fallback user profile comprising the unique fallback identifier to a configuration management server and receiving, by the application client, a corresponding fallback user profile sent by the configuration management server, the user then being authenticated in fallback mode;
      sending, by the application client, a request for fallback multimedia group profiles comprising the unique fallback identifier to a multimedia group management server and receiving, by the application client, at least one corresponding fallback multimedia group profile sent by the multimedia group management server;
      sending, by the application client, a request for fallback multimedia group encryption keys and private communications encryption keys comprising the unique fallback identifier to an encryption keys management server and receiving, by the application client, at least one fallback multimedia group encryption key and at least one corresponding private communications encryption key sent by the encryption keys management server;
      once the application client has received the corresponding fallback user profile, the at least one corresponding fallback multimedia group profile, the at least one fallback multimedia group encryption key and the at least one corresponding private communications encryption key, accessing, by the user, the fallback communication services.

2. The method according to claim 1, wherein the unique fallback identifier is allocated dynamically.

3. The method according to claim 1, wherein once the identity management server has received the authentication request sent by the application client, the identity management server carries out a step of processing the authentication request comprising the following sub-steps:
   requesting, by the identity management server, at least one authentication information from the user;
   supplying, by the user, the at least one authentication information, which has been requested, via the user equipment;
   sending, by the application client, the at least one authentication information supplied by the user to the identity management server and receiving, by the identity management server, the at least one authentication information;
   browsing, by the identity management server, a database of users;
   if the identity management server does not find the at least one authentication information in the database of users, rejecting the authentication request;
   if the identity management server finds the at least one authentication information in the database of users, accepting the authentication request.

4. The method according to claim 3, wherein the unique fallback identifier is associated with the at least one authentication information supplied by the user.

5. The method according to claim 1, wherein in the event of acceptance of the authentication request by the identity management server, the user is authenticated in nominal mode in which the user has access to a nominal user profile and to nominal multimedia groups that the user has defined himself during preceding connections or that an administrator has defined for him.

6. The method according to claim 5, wherein users authenticated in nominal mode and users authenticated in fallback mode cannot communicate with each other.

7. The method according to claim 1, wherein each user of a fallback multimedia group communicates with the other users of the fallback multimedia group.

8. The method according to claim 1, wherein the user is informed that the user is in fallback mode by display of the unique fallback identifier on a screen of the user equipment.

9. A system for implementing a method for configuring access by a user to fallback communication services accessible via a transport network, the access to the fallback communication services requiring an authentication, the system comprising:
   at least one user equipment used by a user, said user equipment hosting an application client configured to send requests to servers and to obtain information coming from the servers;
   at least one database of users;
   at least one identity management server configured to receive and to process an authentication request sent by an application client, to search for authentication information in a database of users and to allocate a unique fallback identifier to a user in the event of rejection of the authentication request;
   at least one configuration management server configured to receive a request for fallback user profile comprising the unique fallback identifier and to send a corresponding fallback user profile to the application client;
   at least one multimedia group management server configured to receive a request for fallback multimedia group profiles comprising the fallback identifier and to send at least one corresponding fallback multimedia group profile to the application client; and
   at least one encryption keys management server configured to receive a request for fallback multimedia group encryption keys and private communications encryption keys and to send at least one corresponding fallback multimedia group encryption key and at least one corresponding private communications encryption key to the application client, wherein once the application client has received the corresponding fallback user profile, the at least one corresponding fallback multimedia group profile, the at least one corresponding fallback multimedia group encryption key and the at least one corresponding private communications encryption key, the fallback communication services are accessible by the user.

10. The system according to claim 9, further comprising an operational administrator configured to monitor the activity of users authenticated in fallback mode, to establish communication with users authenticated in fallback mode and to link up users authenticated in fallback mode with users authenticated in nominal mode.

11. A non-transitory computer readable medium comprising program code instructions for performing the steps of the method according to claim 1 when said program is executed on a computer.

12. A user equipment comprising circuitry for implementing the method according to claim 1.

* * * * *